(12) United States Patent
Tajika et al.

(10) Patent No.: US 10,210,155 B2
(45) Date of Patent: Feb. 19, 2019

(54) APPARATUS STATE ESTIMATION METHOD, APPARATUS STATE ESTIMATION DEVICE, AND DATA PROVIDING DEVICE

(71) Applicant: Panasonic Intellectual Property Management Co., Ltd., Osaka (JP)

(72) Inventors: Yosuke Tajika, Hyogo (JP); Atsushi Yoshida, Osaka (JP); Wei Zhang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/412,227

(22) Filed: Jan. 23, 2017

(65) Prior Publication Data

US 2017/0255610 A1 Sep. 7, 2017

(30) Foreign Application Priority Data

Mar. 1, 2016 (JP) .................... 2016-039468
Sep. 23, 2016 (JP) .................... 2016-185956

(51) Int. Cl.
G06F 17/27 (2006.01)
G06F 11/26 (2006.01)
G06F 11/30 (2006.01)
G06F 11/34 (2006.01)

(52) U.S. Cl.
CPC .......... *G06F 17/2765* (2013.01); *G06F 11/34* (2013.01); *G06F 17/2785* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................... 704/1, 9, 10
See application file for complete search history.

(56) References Cited

U.S. PATENT DOCUMENTS

| | | | | |
|---|---|---|---|---|
| 6,115,656 | A * | 9/2000 | Sudolsky | B64F 5/60 701/3 |
| 9,626,081 | B2 * | 4/2017 | Blanco | G06F 3/0484 |
| 2002/0144181 | A1 * | 10/2002 | Hicks | G06F 11/267 714/25 |
| 2004/0103116 | A1 * | 5/2004 | Palanisanny | G06F 17/30569 |
| 2008/0186160 | A1 * | 8/2008 | Kim | F24F 11/30 340/501 |
| 2008/0225732 | A1 * | 9/2008 | Yoshizawa | G06F 11/0748 370/242 |

(Continued)

FOREIGN PATENT DOCUMENTS

JP 8-029027 2/1996

*Primary Examiner* — Lamont M Spooner
(74) *Attorney, Agent, or Firm* — Greenblum & Bernstein, P.L.C.

(57) ABSTRACT

An apparatus state estimation method includes: storing first apparatus data that indicates a state of an apparatus; storing a work record, the work record being a record indicating a work that has been carried out for maintenance of the apparatus; estimating a category that is a malfunction of the apparatus or a content of a measure by using the work record; and learning a relationship between the estimated category and the first apparatus data.

20 Claims, 11 Drawing Sheets

(56) References Cited

U.S. PATENT DOCUMENTS

| | | | |
|---|---|---|---|
| 2009/0292960 A1* | 11/2009 | Haraden | G06F 11/0745 714/699 |
| 2010/0238037 A1* | 9/2010 | Bristow | G06F 11/0724 340/635 |
| 2010/0251029 A1* | 9/2010 | Agha | G06F 11/2284 714/40 |
| 2011/0047418 A1* | 2/2011 | Drees | G05B 15/02 714/57 |
| 2011/0178977 A1* | 7/2011 | Drees | G05B 15/02 706/52 |
| 2012/0005073 A1* | 1/2012 | Gnorski | G07F 19/209 705/39 |
| 2012/0150529 A1* | 6/2012 | Kim | G06F 17/2809 704/2 |
| 2012/0233132 A1* | 9/2012 | Rajpathak | G06F 17/2795 707/687 |
| 2012/0274962 A1* | 11/2012 | Thomas | H04N 1/00015 358/1.12 |
| 2012/0331340 A1* | 12/2012 | Birkler | G06F 11/0703 714/15 |
| 2013/0262082 A1* | 10/2013 | McKeeman | G06F 17/27 704/9 |
| 2016/0034856 A1* | 2/2016 | Son | G06Q 10/20 705/7.18 |
| 2016/0234031 A1* | 8/2016 | Rabii | H04L 12/185 |
| 2017/0006135 A1* | 1/2017 | Siebel | H04L 67/02 |
| 2017/0039785 A1* | 2/2017 | Richter | G07C 5/008 |
| 2017/0102989 A1* | 4/2017 | Kotikalapudi | G06F 11/0793 |
| 2017/0255610 A1* | 9/2017 | Tajika | G06F 17/2785 |

* cited by examiner

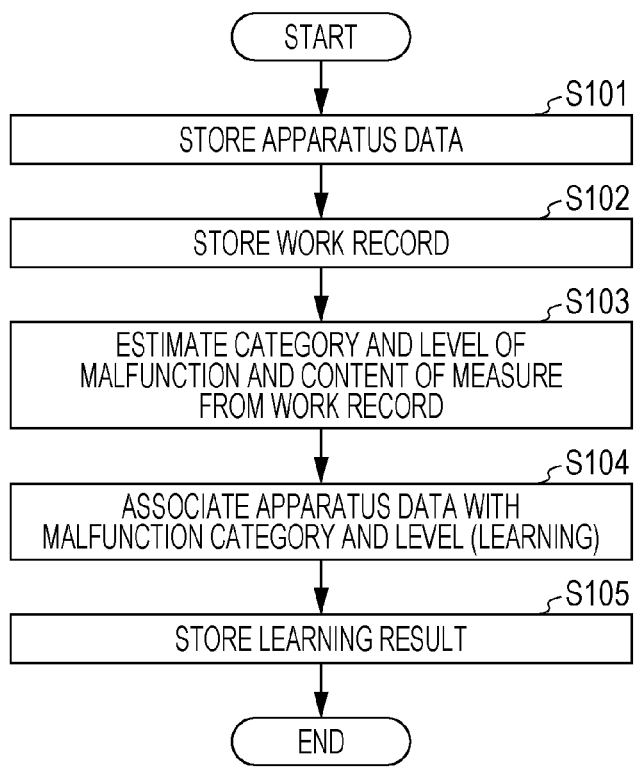

| TIME INFORMATION | | DETECTION DATA 142 | | | | | |
|---|---|---|---|---|---|---|---|
| DETECTION DATE AND TIME 141 | STATE OF APPARATUS | COOLING WATER INLET TEMPERATURE | COOLING WATER OUTLET TEMPERATURE | CONDENSATION TEMPERATURE | COOLING WATER INTERMEDIATE TEMPERATURE | COOLING WATER OUTLET TEMPERATURE | COOLING WATER FLOW RATE |
| 2015/6/5 12:00 | NORMAL | 11.7 | 7.8 | 34.4 | 32.2 | 33.2 | 99.8 |
| 2015/6/5 13:00 | NORMAL | 11.7 | 7.8 | 34.4 | 32.2 | 33.2 | 99.8 |
| 2015/6/5 14:00 | NORMAL | 21.4 | 22.1 | 25.9 | 28.3 | 26.1 | 9.4 |
| 2015/6/5 15:00 | COOLING WATER ABNORMALITY | 11.4 | 8.2 | 34.1 | 32.1 | 33.3 | 99.6 |
| 2015/6/5 16:00 | NORMAL | 9.2 | 8.7 | 27.9 | 26.1 | 26.7 | 100.5 |
| 2015/6/5 17:00 | NORMAL | 11.6 | 7.6 | 33 | 30.5 | 31.7 | 99.3 |
| 2015/6/5 18:00 | NORMAL | 12.1 | 7.8 | 33.8 | 31.1 | 32.4 | 99.1 |
| 2015/6/5 19:00 | NORMAL | 11.9 | 7.9 | 34.1 | 31.5 | 32.8 | 99.6 |
| 2015/6/5 20:00 | NORMAL | 17.1 | 12.2 | 34.5 | 31.9 | 33.6 | 99.7 |
| 2015/6/5 21:00 | NORMAL | 12.4 | 7.9 | 35.3 | 32.4 | 33.7 | 98.8 |
| 2015/6/5 22:00 | NORMAL | 13.2 | 9.1 | 34.7 | 31.3 | 32.4 | 100.4 |
| 2015/6/5 23:00 | NORMAL | 15.2 | 13.6 | 34.6 | 33.4 | 30.9 | 8.6 |

| TIME MEASURES TAKEN | UNFIXED-FORMAT RECORD 133 |
|---|---|
| 2015/6/5 18:00 | ALARM WENT OFF PERTAINING TO <u>COOLING WATER ABNORMALITY</u>. THUS, VISITED THE SITE <u>ON THE VERY DAY</u> AND <u>REPLACED PARTS</u>. |

FIG. 7

| CATEGORY | WORD |
|---|---|
| COOLING WATER ABNORMALITY | COOLING<br>LOW TEMPERATURE |
| COOL WATER ABNORMALITY | TEMPERATURE<br>COOL WATER<br>HIGH TEMPERATURE<br>SETTING |
| ... | ... |

FIG. 8

| | CATEGORY EXAMPLES | LEVEL EXAMPLES | |
|---|---|---|---|
| ESTIMATATION OF CATEGORY AND LEVEL OF MALFUNCTION | COOLING WATER ABNORMALITY<br>COOL WATER ABNORMALITY<br>VACUUM ABNORMALITY<br>OIL ABNORMALITY | SERIOUS | HANDLE ON THE VERY DA<br>TAKE EMERGENCY MEASURE |
| | | MINOR | UNDER OBSERVATION<br>NO REPRODUCTION |

| | CATEGORY EXAMPLES | LEVEL EXAMPLES | |
|---|---|---|---|
| ESTIMATATION OF CATEGORY AND LEVEL OF CONTENT OF MEASURE | MEASUREMENT<br>VISUAL INSPECTION<br>(TACTILE INSPECTION)<br>SET VALUE ADJUSTMENT<br>PARTS REPLACEMENT<br>UNIT REPLACEMENT | EMERGENCY | REPLACE ON THE VERY DAY<br>TAKE EMERGENCY MEASURE<br>(REPLACE ON LATER DATE) |
| | | MINOR | SIMPLE<br>(MEASUREMENT,<br>VISUAL INSPECTION)<br>BASIC SETTING<br>UNDER OBSERVATION<br>NO REPRODUCTION |

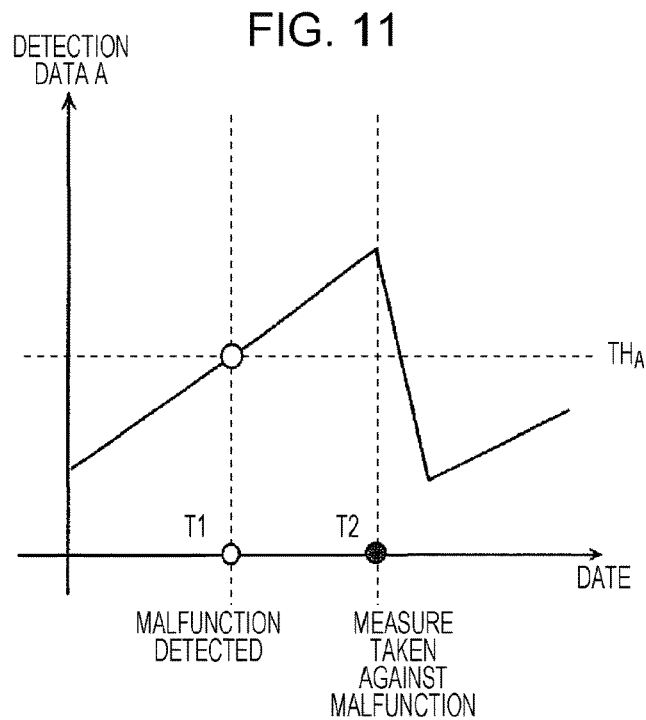
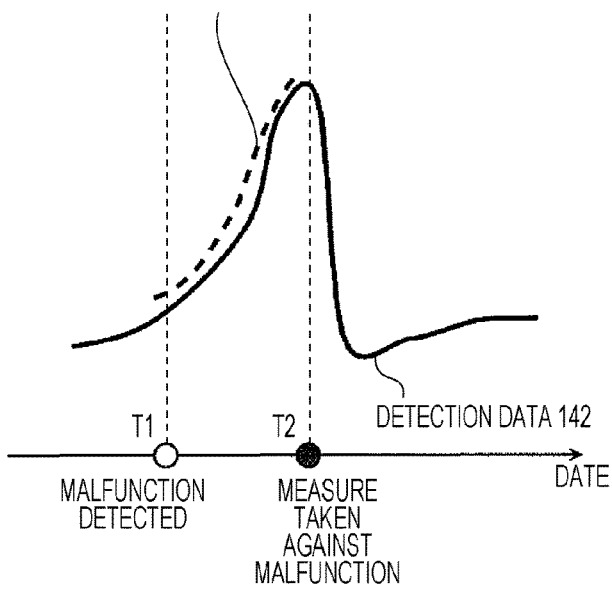

FIG. 15
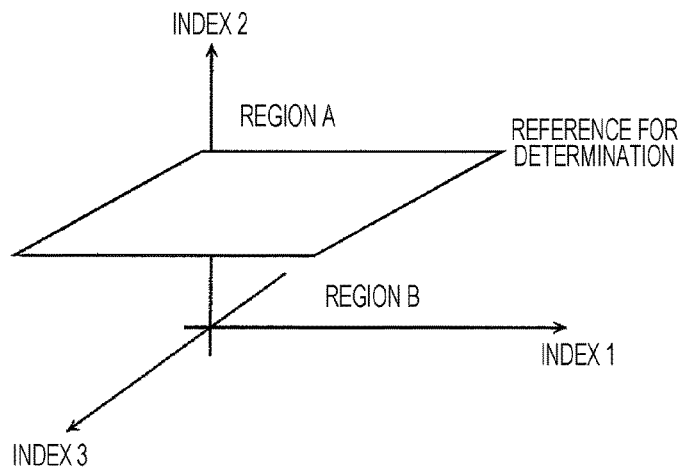
FIG. 16
| CONDITION FOR DETERMINING APPARATUS STATE | MALFUNCTION | | CONTENT OF MEASURE | |
|---|---|---|---|---|
| | CATEGORY | LEVEL | CATEGORY | LEVEL |
| DETECTION DATA A IS NO LESS THAN $TH_A$ | COOLING WATER ABNORMALITY | HANDLE ON THE VERY DAY | PARTS REPLACEMENT | REPLACE ON THE VERY DAY |
| | 152 | 153 | 154 | 155 |
134
FIG. 17
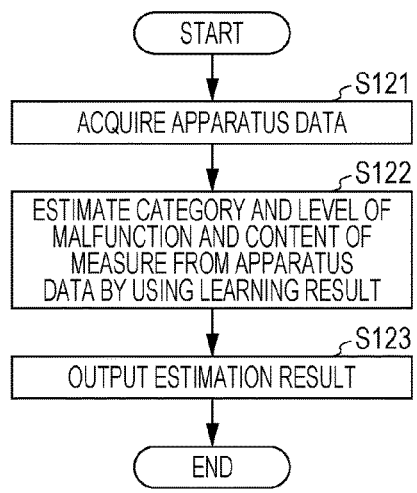

APPARATUS STATE ESTIMATION METHOD, APPARATUS STATE ESTIMATION DEVICE, AND DATA PROVIDING DEVICE

BACKGROUND

1. Technical Field

The present disclosure relates to apparatus state estimation methods, apparatus state estimation devices, and data providing devices.

2. Description of the Related Art

In management of apparatuses that require maintenance, such as a large-sized air conditioner or a refrigerating apparatus, there is known a technique for estimating the state of an apparatus by using operation data or the like acquired by an internal sensor of the apparatus (see, for example, Japanese Unexamined Patent Application Publication No. 8-29027).

In such a system, there is a demand that the state of an apparatus be estimated with higher accuracy.

SUMMARY

One non-limiting and exemplary embodiment provides an apparatus state estimation method, an apparatus state estimation device, or a data providing device that makes it possible to estimate the state of an apparatus with high accuracy.

In one general aspect, the techniques disclosed here feature an apparatus state estimation method that includes storing apparatus data that indicates a state of an apparatus, storing a work record, the work record being a record indicating a work that has been carried out for maintenance of the apparatus, estimating a category that is a malfunction of the apparatus or a content of a measure by using the work record, and learning a relationship between the estimated category and the apparatus data.

The present disclosure provides an apparatus state estimation method or an apparatus state estimation device that makes it possible to estimate the state of an apparatus with high accuracy.

It is to be noted that general or specific embodiments of such may be implemented in the form of a system, a method, an integrated circuit, a computer program, or a computer-readable recording medium, such as a CD-ROM, or through a desired combination of a system, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart of learning processing of an apparatus state estimation device according to an embodiment;

FIG. 4 illustrates an example of apparatus data according to an embodiment;

FIG. 7 illustrates an example of a word list according to an embodiment;

FIG. 8 illustrates an example of the categories and levels of malfunctions and contents of measures according to an embodiment;

FIG. 11 is an illustration for describing learning processing according to an embodiment;

FIG. 12 is an illustration for describing learning processing according to an embodiment;

FIG. 15 is an illustration for describing learning processing according to an embodiment;

FIG. 16 illustrates an example of a learning result according to an embodiment;

FIG. 17 is a flowchart of apparatus state estimation processing of an apparatus state estimation device according to an embodiment.

DETAILED DESCRIPTION

Figure 1:
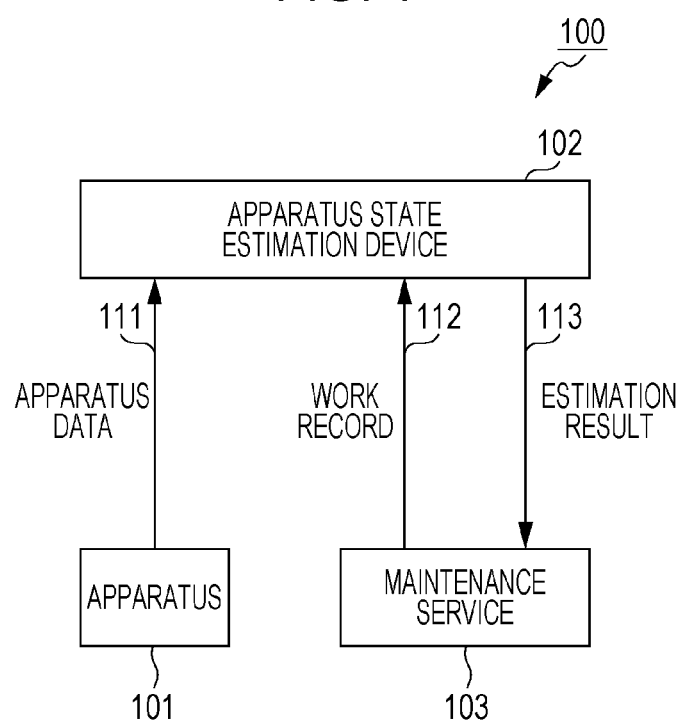
FIG. 1 illustrates a configuration of an apparatus state estimation system according to an embodiment.

Underlying Knowledge Forming Basis of the Present Disclosure

In management of an apparatus such as a large-sized air conditioner or a refrigerating apparatus, it is desired that a malfunction or a trouble, such as a failure or performance deterioration, be prevented and a high-quality and long-life operation be achieved. Described in the present embodiment are a system and a device that make it possible to estimate the state of an apparatus with high accuracy by estimating the state of the apparatus with the use of not only the operation data of the apparatus but also the record of maintenance carried out by a service person or the like. Furthermore, described in the present embodiment are a system and a device that can use not only a fixed-format maintenance record that is based on a predefined category or format but also an unfixed-format maintenance record that includes a visual inspection, miscellaneous thoughts, and so on of a service person.

An apparatus state estimation method according to an aspect of the present disclosure includes storing first apparatus data that indicates a state of an apparatus, storing a work record, the work record being a record indicating a work that has been carried out for maintenance of the apparatus, estimating a category that is a malfunction of the apparatus or a content of a measure by using the work record, and learning a relationship between the estimated category and the first apparatus data.

According to this aspect, the relationship between the apparatus data and the categories of the malfunction and of the content of the measure estimated from the work record is learned automatically. Thus, even when the accuracy of the correspondence relationship therebetween set initially is low, the accuracy of this correspondence relationship can be increased. Furthermore, a database that has extracted the know-how of a service person on the basis of this result can be created. Thus, the state of the apparatus can be estimated with high accuracy, and the content of an appropriate measure can be identified.

For example, a level of not only the type but also the state of the estimated category may further be estimated by using the work record in the estimating, and a relationship between a set of the estimated category and the estimated level and the first apparatus data may be learned in the learning.

According to this example, a malfunction and a content of a measure can be associated with the apparatus data for each level. Thus, more detailed learning can be achieved, and the state of the apparatus can be estimated with higher accuracy.

For example, the work record may be a work record written in free format, and the category may be estimated from the work record by using text mining in the estimating.

According to this example, learning can be carried out by using not only a fixed-format work record but also an unfixed-format work record. Thus, categories and formats for the work record do not have to be prepared in advance, and a free input from a service person can be obtained. Thus, learning can be carried out by using a larger amount of information.

For example, the first apparatus data may indicate a measured value of characteristics of the apparatus or a set value of the apparatus, and a relationship between the category and a condition that the measured value, the set value, or an index obtained through an arithmetic expression predefined from the measured value or the set value falls within a predefined range may be learned in the learning.

For example, the first apparatus data may indicate a change over time of a measured value of characteristics of the apparatus data or a set value of the apparatus, and a relationship between the category and a pattern of the change over time of the measured value or the set value may be learned in the learning.

For example, the work record may be a work record written in free format, and the estimating may include extracting a plurality of words from the work record, determining a degree of match between the plurality of words and a plurality of word lists set in advance and estimating the category that is associated with a word list whose degree of match is higher than a threshold value as a category of a malfunction of the apparatus or of a content of a measure, and registering the plurality of words as a new word list in a case in which the plurality of words do not match the plurality of word lists and the degree of match is higher than the threshold value.

According to this example, in a case in which a word group other than a word list registered in advance is extracted, this word group can be newly registered. Thus, the word list can be expanded and optimized automatically.

For example, the apparatus state estimation method further includes acquiring second apparatus data that indicates a state of the apparatus, estimating a category of a malfunction of the apparatus or of a content of a measure on the basis of a learning result of the learning and the second apparatus data, and outputting the estimated category to a display device of a user.

According to this example, the category of the malfunction of the apparatus or of the content of the measure can be estimated on the basis of the learning result, and the estimation result can be output.

An apparatus state estimation device according to an aspect of the present disclosure includes an apparatus data storage that stores apparatus data that indicates a state of an apparatus, a work record storage that stores a work record, the work record being a record indicating a work that has been carried out for maintenance of the apparatus, a category estimator that estimates a category that is a malfunction of the apparatus or a content of a measure by using the work record, and a learner that learns a relationship between the estimated category and the apparatus data.

According to this aspect, the relationship between the apparatus data and the categories of the malfunction and of the content of the measure estimated from the work record is learned automatically. Thus, even when the accuracy of the correspondence relationship set in advance is low, the accuracy of this correspondence relationship can be increased. Furthermore, the know-how of a service person can be extracted and turned into a database. Thus, the state of the apparatus can be estimated with high accuracy.

This makes it possible to follow not only the accuracy per event but also a chronological change associated with time passage.

A data providing device according to an aspect of the present disclosure acquires apparatus data that indicates a state of an apparatus, estimates a category that is a malfunction of the apparatus or a content of a measure by using a work record of the apparatus carried out before the apparatus data is acquired and the apparatus data, appends a level that indicates that the urgency is high or a level that indicates that the urgency is low to the estimated category, and provides apparatus state estimation data that includes the category and the level to a display device of a user.

According to this aspect, the category of the malfunction of the apparatus or of the content of the measure can be estimated on the basis of the past work record and the apparatus data, and the estimation result can be output.

For example, the data providing device may select data to be provided to the display device in accordance with a type of the display device.

According to this example, appropriate data can be provided in accordance with the type of the display device.

For example, the data providing device may provide, to the display device, data of the level that indicates that the urgency is high and data of the level that indicates that the urgency is low in a case in which the display device is a stationary terminal.

According to this example, the user can grasp all of the situations regardless of the level of the urgency.

The data providing device may provide, to the display device, only data of the level that indicates that the urgency is high, of data of the level that indicates that the urgency is high and data of the level that indicates that the urgency is low, in a case in which the display device is a mobile terminal.

This can reduce the burden of the user who is outside a management center or the like. In this case, the user may check the category whose urgency is low upon arriving at the management center or the like.

It is to be noted that general or specific embodiments of the above may be implemented in the form of a system, a method, an integrated circuit, a computer program, or a computer-readable recording medium, such as a CD-ROM, or through a desired combination of a system, a method, an integrated circuit, a computer program, and a recording medium.

Hereinafter, embodiments will be described in concrete terms with reference to the drawings.

It is to be noted that the embodiments described hereinafter illustrate specific examples of the present disclosure. The numerical values, the shapes, the materials, the constituent elements, the arrangement and positions of the constituent elements, the connection modes of the constituent elements, the steps, the order of the steps, and so forth indicated in the embodiments hereinafter are examples and are not intended to limit the present disclosure. In addition, among the constituent elements described in the embodiments hereinafter, a constituent element that is not described in an independent claim indicating the broadest concept is described as an optional constituent element.

First Embodiment

An apparatus state estimation device according to the present embodiment learns a correspondence relationship between a work record, which is a record of maintenance or the like carried out by a service person or the like, and apparatus data that relates to the state of an apparatus, and examples of the apparatus data include a set value of the apparatus, a measured value such as the temperature or the pressure at each site detected by a sensor, an alert, the hours of operation of the apparatus, and a cumulative value such as the number of times the apparatus is started. Thus, the apparatus state estimation device can estimate the state of the apparatus with high accuracy.

First, a configuration of an apparatus state estimation system 100 according to the present embodiment will be described. FIG. 1 illustrates a configuration of the apparatus state estimation system 100 according to the present embodiment.

As illustrated in FIG. 1, the apparatus state estimation system 100 includes, for example, an apparatus 101, which is a large-sized air conditioner, an apparatus state estimation device 102 that estimates the state of the apparatus 101, and a maintenance service 103 that carries out the maintenance of the apparatus 101. The apparatus 101 is not limited to a large-sized air conditioner and may be any desired apparatus. For example, the apparatus 101 can be a freezing or refrigerating apparatus, an apparatus equipped within a building, a manufacturing apparatus at a plant, or an industrial apparatus that requires maintenance.

The maintenance service 103 may be not only a service at a customer support department but also a service at a design department that develops the apparatus or at a sales department that serves the users.

The apparatus state estimation device 102, for example, is a server that is connected to the apparatus 101 and the maintenance service 103 via a network. The system architecture of the server is not particularly limited and may be a cloud server, an on-premise server, or the like. The apparatus state estimation device 102 acquires apparatus data 111 from the apparatus 101. The apparatus data 111 indicates the state of the apparatus and includes, for example, the set value of the apparatus 101, the measured value of the characteristics of the apparatus detected by a sensor installed in the apparatus 101, or the like. The apparatus state estimation device 102 acquires a work record 112 from the maintenance service 103. The work record 112 is a record of work carried out for the maintenance of the apparatus 101 and, for example, is a record of work and visual inspections carried out by a service person at the maintenance service 103 for the maintenance of the apparatus 101, such as repairs, general maintenance, and cleaning.

The apparatus state estimation device 102 estimates the categories and the levels of a malfunction and of a content of a measure on the basis of the work record 112 and learns (machine learning) the relationship between the apparatus data 111 and the categories and levels of the malfunction and of the content of the measure by making an association between the estimation result and the apparatus data 111 so as to make a correlation therebetween. The apparatus state estimation device 102 estimates the state of the apparatus from the apparatus data 111 by using the learning result and outputs an estimation result 113 to the maintenance service 103.

Figure 2:
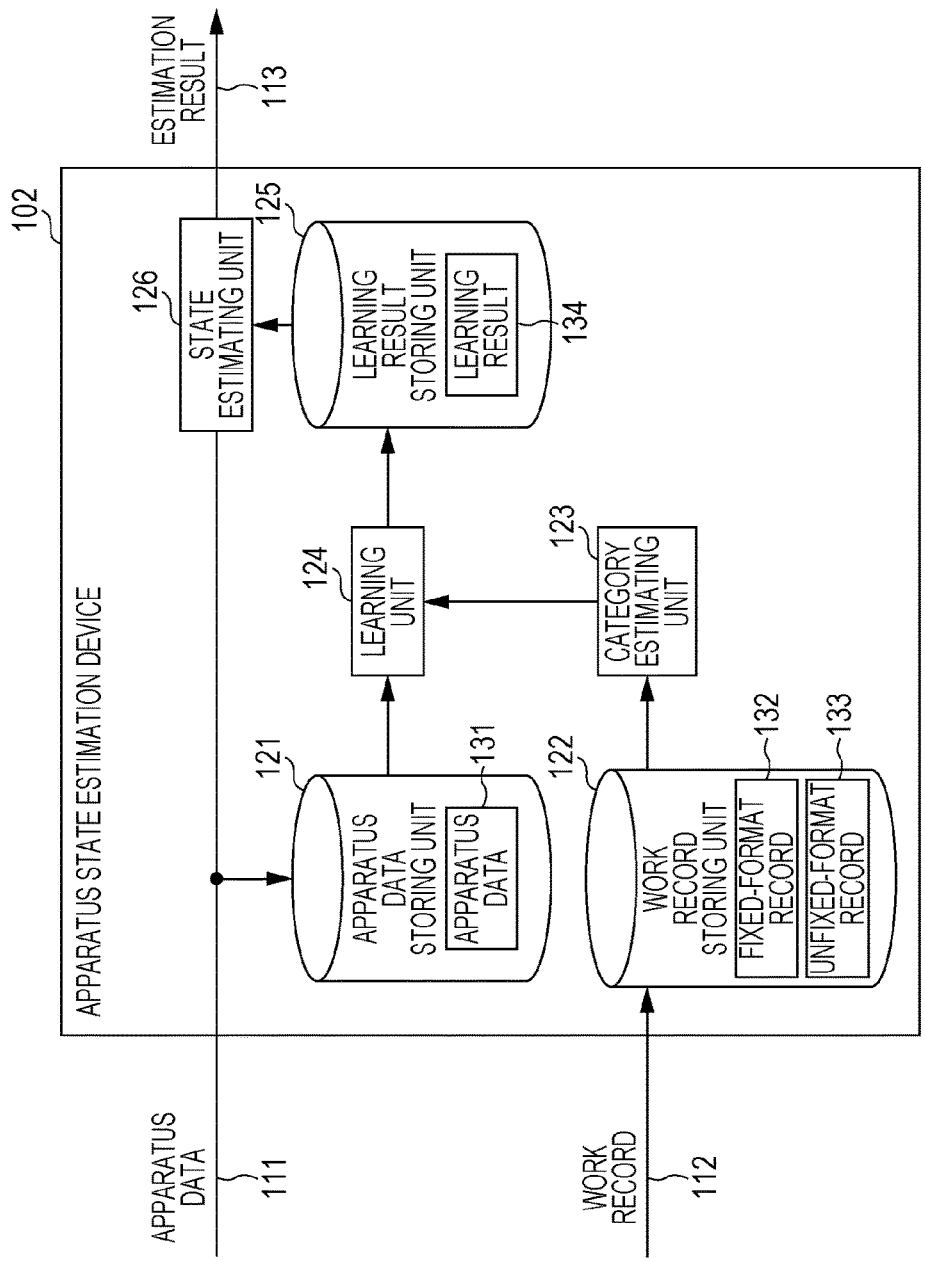
FIG. 2 is a block diagram of an apparatus state estimation device according to an embodiment.

Hereinafter, the details of the configuration of the apparatus state estimation device 102 will be described. FIG. 2 is a block diagram of the apparatus state estimation device 102. As illustrated in FIG. 2, the apparatus state estimation device 102 includes an apparatus data storing unit 121, a work record storing unit 122, a category estimating unit 123, a learning unit 124, a learning result storing unit 125, and a state estimating unit 126.

The apparatus data storing unit 121 successively acquires the apparatus data 111 from the apparatus 101 and stores the acquired apparatus data 111 as apparatus data 131.

The work record storing unit 122 successively acquires the work record 112 from the maintenance service 103 and stores the acquired work record 112. The work record 112 includes a fixed-format record and an unfixed-format record, which are stored as a fixed-format record 132 and an unfixed-format record 133, respectively. A fixed-format record is information in which categories are set in advance. An unfixed-format record is unfixed-format information whose format is not uniform, such as an operation log written in free format.

The category estimating unit 123 estimates the categories and the levels of a malfunction and of a content of a measure by using the fixed-format record 132 and the unfixed-format record 133.

The learning unit 124 makes an association between the apparatus data 131 and the categories and levels of the malfunction and of the content of the measure estimated by the category estimating unit 123 and thus learns the relationship between the apparatus data 131 and the categories and levels of the malfunction and of the content of the measure.

The learning result storing unit 125 stores a learning result 134 of the learning unit 124.

The state estimating unit 126 estimates the state of the apparatus 101 from the apparatus data 111 or 131 by using the learning result 134 and outputs the estimation result 113.

Hereinafter, a learning operation of the apparatus state estimation device 102 in which the relationship between the apparatus data 131 and the categories and levels of a malfunction and of a content of a measure is learned will be described. FIG. 3 is a flowchart of the learning operation of the apparatus state estimation device 102.

First, the apparatus data storing unit 121 successively acquires the apparatus data 111 from the apparatus 101 and stores the acquired apparatus data 111 as the apparatus data 131 (S101). FIG. 4 illustrates an example of the apparatus data 131.

As illustrated in FIG. 4, the apparatus data 131 includes time information 141 and detection data 142. The time information 141 indicates the time at which the detection data 142 is detected. The detection data 142 is a set value of the apparatus 101 or a measured value detected by a sensor provided in the apparatus 101. In other words, the apparatus data 131 indicates a change over time of the measured value of the characteristics of the apparatus 101 or of the set value of the apparatus 101. The categories in the detection data 142 illustrated in FIG. 4 are examples of sensor values measured in an absorption refrigerator. The categories in the detection data 142 are not limited thereto and may include any desired category. In the case of a high-performance apparatus, a result obtained by carrying out a predetermined arithmetic operation on the set value or the measured value may be used as the detection data 142. As illustrated in FIG. 4, the detection data 142 may include information that directly indicates the state (normal or abnormal, and an abnormal category) of the apparatus 101.

Figures 5, 6:
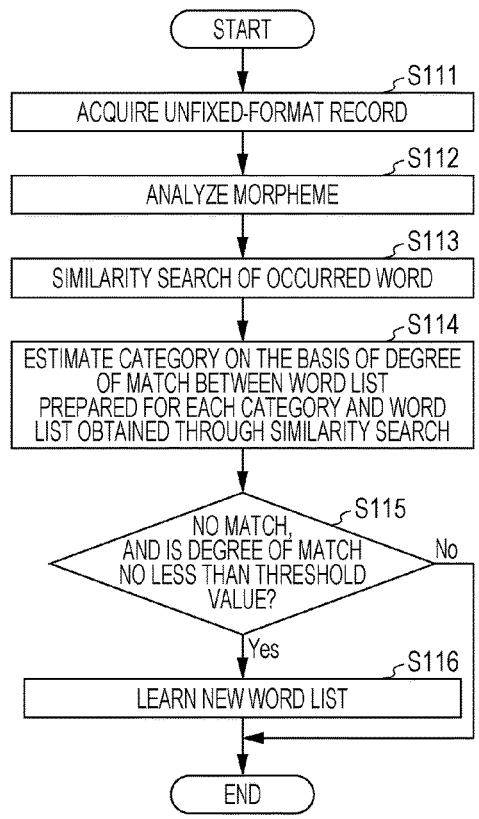
FIG. 5 illustrates an example of an unfixed-format record according to an embodiment.
FIG. 6 is a flowchart of category estimation processing of an apparatus state estimation device according to an embodiment.

The work record storing unit 122 successively acquires the work record 112 from the maintenance service 103 and stores the acquired work record 112 as the fixed-format record 132 or the unfixed-format record 133 (S102). The unfixed-format record 133, for example, is character data written in a natural language, as illustrated in FIG. 5. The unfixed-format record 133 may instead be audio data or image data. In this case, the audio data or the image data is transformed into character data or numerical data through speech recognition or image recognition. For example, the unfixed-format record 133 describes the environment (the weather, the temperature), the reason for the visit, the comment by the user, the content of the checks and findings of the service person, the content of work carried out by the service person, the state and the findings after the work is carried out, matters that are to be handed over, and so on in a natural language in the form of a log or the like. The unfixed-format record 133 also includes a mode in which some of the categories are in fixed-format. For example, as illustrated in FIG. 5, the unfixed-format record 133 may include information that indicates the time at which the measure is taken.

The fixed-format record 132 indicates the date and time, an installation location, an operation time, a set value, measurement data, a category of a measure in fixed-format, and so on. At least some of these categories may be indicated in the unfixed-format record 133.

The category estimating unit 123 estimates the categories of a malfunction and of a content of a measure and the levels of the malfunction and of the content of the measure by using the fixed-format record 132 and the unfixed-format record 133 (S103). Although an example in which the categories and the levels of a malfunction and of a content of a measure are estimated will be described hereinafter, the levels do not necessarily have to be estimated. In addition, only one of the malfunction and the content of the measure may be estimated. The level of a malfunction indicates the scale (degree) such as the magnitude of damage to be caused by the malfunction, and the level of a content of a measure indicates the priority or the urgency (degree) of the target content. When these are indicated in the form of the degree, linguistic expressions such as "considerably" or "somewhat" may also be used.

FIG. 6 is a flowchart of processing of the category estimating unit 123 for estimating the categories and the levels of a malfunction and of a content of a measure with the use of the unfixed-format record 133.

First, the category estimating unit 123 acquires the unfixed-format record 133 (S111). The category estimating unit 123 analyzes the morphemes of an input character string and thus divides the character string into words (S112). With this operation, a plurality of words are extracted from the unfixed-format record 133. The category estimating unit 123 carries out preprocessing of deleting a word that is not necessary in a similarity search, as necessary.

The category estimating unit 123 carries out a similarity/correlation search of an occurred word on the preprocessed words. The category estimating unit 123 generates a simple list or a correlation list of words within a threshold value and a combination of a simple list and a correlation list on the basis of the numerical value result, which is the search result. The category estimating unit 123 compares the word list obtained through the similarity search with a word list generated in advance for each combination of the category and the level of a malfunction and estimates the category in the word list that is identical or has a high degree of match (the degree of match is no less than a threshold value) as the category and the level of the malfunction. The category estimating unit 123 estimates the category and the level of a content of a measure through a similar technique (S114). In other words, the category estimating unit 123 determines the degree of match between a plurality of words extracted from the unfixed-format record 133 and a plurality of word lists set in advance and estimates the category of a malfunction or of a content of a measure that is associated with a word list whose degree of match is higher than a threshold value as the category of the malfunction of the apparatus 101 or of the content of the measure.

FIG. 7 illustrates an example of a word list. As illustrated in FIG. 7, one or more words are registered for each category in the word list. The category estimating unit 123 estimates the category that contains a plurality of words extracted from the unfixed-format record 133 or the category that contains words in a larger number as the category of the malfunction of the apparatus 101 or of the content of the measure.

For example, in a case in which the term "cooling" is contained in a predetermined number or more in the words extracted from the unfixed-format record 133 with the use of the word list illustrated in FIG. 7, it is estimated that the cooling water abnormality has occurred in the apparatus 101.

In a case in which the word list obtained through a similarity search does not match the registered word list and the degree of match is no less than a threshold value (Yes in S115), the category estimating unit 123 may register the word list obtained through the similarity search as a new word list (S116). For example, a new word is registered under the column labeled "word" in FIG. 7. Thus, a new word list is learned. The category estimating unit 123 may learn the threshold value of the degree of match.

FIG. 8 illustrates an example of a word list to be used to estimate the categories of a malfunction that occurs in a large-sized air conditioner and of a content of a measure and the levels of the malfunction and of the target content. For example, in FIG. 8, "cooling water abnormality," "cool water abnormality," "vacuum abnormality," "oil abnormality," and so on are registered as the exemplary categories of the malfunction of the large-sized air conditioner. The levels of the malfunction include a serious malfunction and a minor malfunction. As the words for making a determination of a serious malfunction, "handle on the very day" and "take emergency measure" are registered, and as the words for making a determination of a minor malfunction, "under observation," "no reproduction," and so on are registered. As the categories of the content of the measures, "measurement," "visual inspection (tactile inspection)," "set value adjustment," "parts replacement," "unit replacement," and so on are registered. The categories for estimating the level, such as the priority or the urgency, of the content of the measure include an example in which the urgency is high and an example in which the urgency is low. As the examples in which the urgency is high, "handle on the very day" and "take emergency measure (replace on later date)" are indicated, and as the examples in which the urgency is low, "simple (measurement, visual inspection)," "basic setting," "under observation," "no reproduction," and so on are indicated. For each of the categories, its primary content and auxiliary content may be indicated in fixed-format or in free format.

Figures 9, 10:
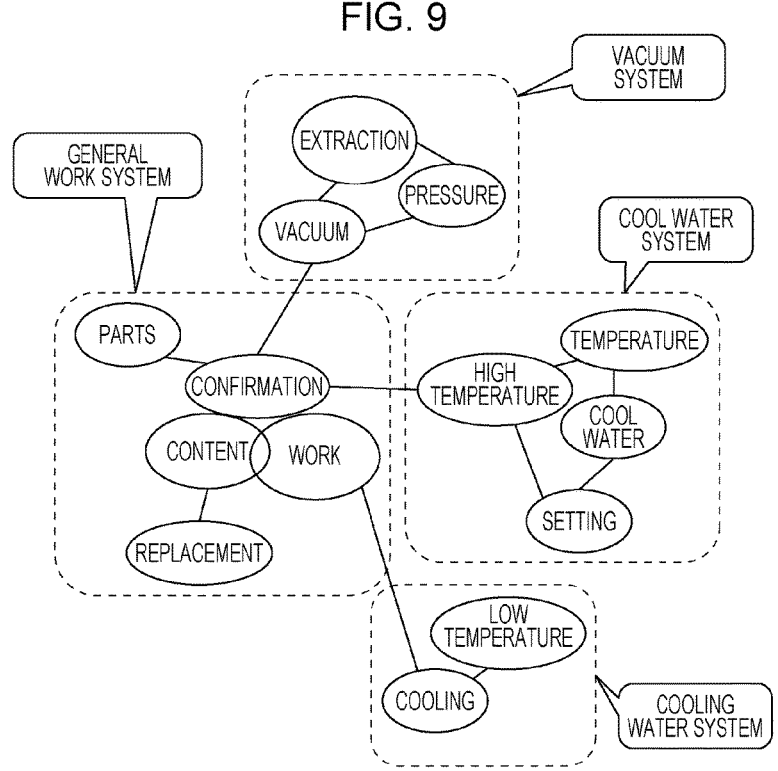
FIG. 9 illustrates an example of a processing method of estimating the categories and the levels of a malfunction and of a content of a measure according to an embodiment.
FIG. 10 illustrates an example of a result of estimating the categories and the levels of a malfunction and of a content of a measure according to an embodiment.

As a specific method for the estimation processing, text mining processing can be used. FIG. 9 is an illustration for describing this text mining processing. FIG. 9 illustrates an example of a case in which the category of a malfunction is estimated.

The category estimating unit 123 estimates the category by using a text mining technique that uses the frequency at which a keyword appears and the degree of connectedness of words from the unfixed-format record 133, which is a work record written in free format. For example, the category estimating unit 123 generates a co-occurrence network by using a numerical rating index such as the Jaccard coefficient. The category estimating unit 123 extracts a word set having a strong connectedness by using the generated co-occurrence network. The category estimating unit 123 determines to which malfunction category (cooling water system, cool water system, etc.) the extracted word set belongs and thus determines the category (cooling water, cool water, etc.) of the malfunction. In other words, the category estimating unit 123 estimates the category of the malfunction by carrying out the degree of similarity matching processing between the extracted word set and a dictionary created in advance. The category of the content of the measure and the level of each category can also be estimated through a similar technique.

FIG. 10 illustrates an example of an estimation result estimated from the apparatus data 131 (FIG. 4) transmitted from the apparatus 101 and the work record (the unfixed-format record 133 illustrated in FIG. 5) registered by the maintenance service 103. As illustrated in FIG. 10, the category 152 of the malfunction, the level 153 of the malfunction, the category 154 of the content of the measure, and the level 155 of the content of the measure illustrated in FIG. 8 are estimated from the unfixed-format record 133, and the relationship illustrated in FIG. 10 is estimated.

In addition, time information 151 is estimated. The time information 151 may be estimated from the unfixed-format record 133 or extracted from the fixed-format record 132. For example, the time information 151 includes the detection time, which is the time at which the malfunction is detected, and the time the measure is taken, which is the time at which the measure against the malfunction is taken. The time information 151 may indicate only one of the detection time and the time the measure is taken.

Referring back to the flowchart illustrated in FIG. 3, the description continues. After step S103, the learning unit 124 makes an association between the apparatus data 131 and the categories and levels of the malfunction and of the content of the measure estimated by the category estimating unit 123 and thus learns the relationship between the apparatus data 131 and the categories and levels of the malfunction and of the content of the measure (S104). Specifically, the learning unit 124 learns the relationship between the set of the estimated categories and levels and the apparatus data 131.

FIGS. 11 through 15 are illustrations for describing the association processing between the estimation result and the apparatus data 131.

First, the learning unit 124 acquires, from the apparatus data 131 stored in the apparatus data storing unit 121, the detection data 142 detected after a time T1 indicated by the time information 151 included in the estimation result. The learning unit 124 determines whether one or more pieces of data in the plurality of pieces of data included in the acquired detection data 142 satisfy a specific condition. For example, as illustrated in FIG. 11, as a condition, the learning unit 124, for example, preliminarily sets the value of detection data A of the time at which the cooling water abnormality is detected as a malfunction in a threshold value $TH_A$ and determines whether the detection data A falls below the value of the $TH_A$ after a measure against the cooling water abnormality is taken. In a case in which the detection data A falls below the threshold value $TH_A$ as the measure against the cooling water abnormality is taken, the learning unit 124 determines that the detection data A is detection data related to the cooling water abnormality and employs the threshold value $TH_A$ as the determination condition for the cooling water abnormality. Furthermore, by making an association between the determination condition and the estimation result (FIG. 10), a learning result 134 illustrated in FIG. 16 is generated. In other words, the category 152 of the malfunction, the level 153 of the malfunction, the category 154 of the content of the measure, and the level 155 of the content of the measure in a case in which the detection data A has exceeded the threshold value $TH_A$ are learned. When the detection data A does not fall below the threshold value $TH_A$ even after the measure against the cooling water abnormality is taken, it is determined that the detection data A is data unrelated to the malfunction A, and the learning does not take place.

The above condition may be whether the maximum value, the minimum value, or the mean value of data of a predetermined category included in the detection data A is no less than a threshold value, is no greater than a threshold value, or falls within a predetermined range.

As illustrated in FIG. 12, as the condition, the learning unit 124 may determine whether data of a predetermined category included in the detection data 142 matches (is similar to) a predefined reference pattern 143. In other words, the learning unit 124 may learn the relationship between the pattern of a change over time of the measured value or the set value indicated in the apparatus data 131 and the categories of the malfunction and of the content of the measure.

Instead of carrying out the determination processing on the data of a single category included in the detection data 142, the determination processing may be carried out on the data of a plurality of categories, or the determination processing may be carried out on one or more indices calculated from the data of a plurality of categories. For example, the degree of abnormality described in Japanese Unexamined Patent Application Publication No. 8-29027 may be used as this index. The deterioration degree or the like indicating the degree of deterioration of the apparatus 101 or of a component of the apparatus 101 may be used as the index.

Figure 13:
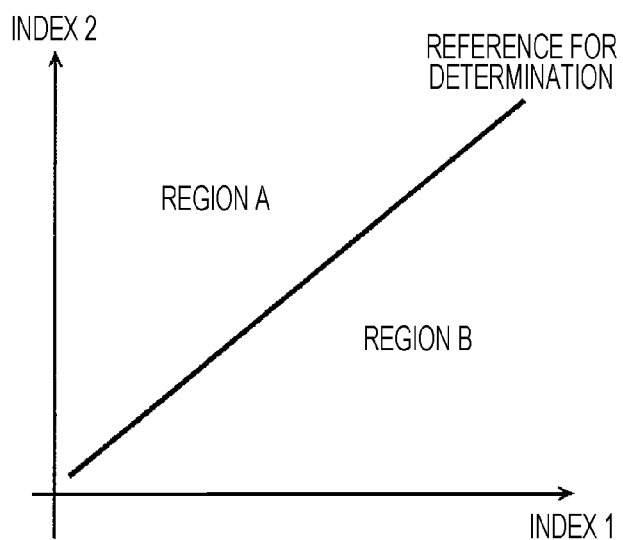
FIG. 13 is an illustration for describing learning processing according to an embodiment.
Figure 14:
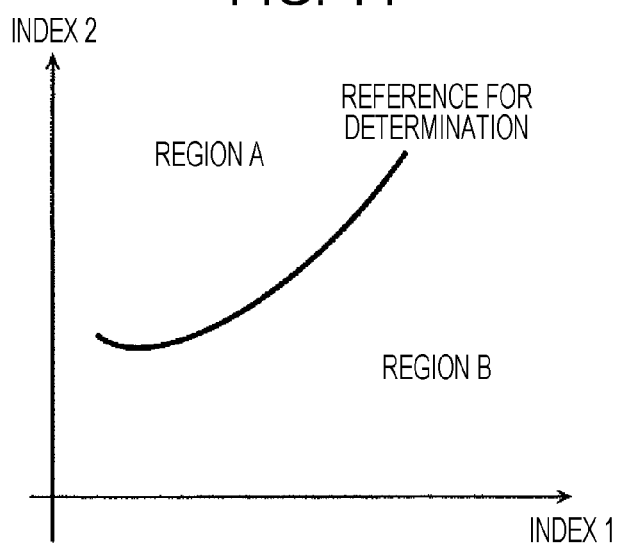
FIG. 14 is an illustration for describing learning processing according to an embodiment.

As illustrated in FIG. 13, it may be determined in which of a region A and a region B divided by a reference for determination a point indicated by two indices is contained. A nonlinear reference for determination as illustrated in FIG. 14 may be used, or it may be determined in which region a point indicated by three indices is contained, as illustrated in FIG. 15.

The above may be combined. In other words, it is determined to which of the plurality of conditions the detection data 142 of the time T1 to the time T2 correspond.

In this manner, the learning unit 124 may learn a relationship between a condition that the measured value or the set value indicated in the apparatus data 131 or the index obtained through an arithmetic expression predefined from the measured value or the set value falls within a predetermined range and the categories of the malfunction and of the content of the measure.

Next, apparatus state estimation processing of the apparatus state estimation device 102 with the use of the learning result 134 will be described. FIG. 17 is a flowchart of the apparatus state estimation processing.

First, the state estimating unit 126 acquires the detection data 142 of a period to be estimated from the apparatus data 131 (S121).

The state estimating unit 126 determines a pattern (condition), among a plurality of patterns (conditions), that is satisfied by the detection data 142 of the period to be estimated. This processing is similar to the determination processing of the learning unit 124 described above. The state estimating unit 126 extracts a category that matches the determination result by using the learning result 134. Specifically, the state estimating unit 126 acquires the category 152 of the malfunction associated with the pattern of the determination result in the learning result 134, the level 153 of the malfunction, the category 154 of the content of the measure, and the level 155 of the content of the measure (S122).

The state estimating unit 126 outputs the acquired category 152 of the malfunction, the level 153 of the malfunction, the category 154 of the content of the measure, and the level 155 of the content of the measure as the estimation result 113 (S123).

As described above, the apparatus state estimation device 102 according to the present embodiment estimates the categories and the levels of the malfunction and of the content of the measure from the work record 112 and makes an association between the estimation result and the apparatus data 131 of the apparatus 101. Thus, the state of the apparatus can be estimated with high accuracy, and the content of an appropriate measure can be identified.

As the operation or the control method of the apparatus 101 becomes more complex, the number of categories of malfunctions that could occur and of the content of the measures increases. It is difficult to put these categories in a format in advance and manage them.

In the meantime, with the use of the technique of the present embodiment, the relationship between the categories of the malfunction and of the content of the measure estimated from the work record and the apparatus data is learned automatically. Thus, even in a case in which the accuracy of the correspondence relationship set in advance is low, the accuracy of this correspondence relationship can be increased. Furthermore, the know-how of a service person can be extracted and turned into a database. Thus, the state of an apparatus can be estimated with high accuracy.

Figure 18:
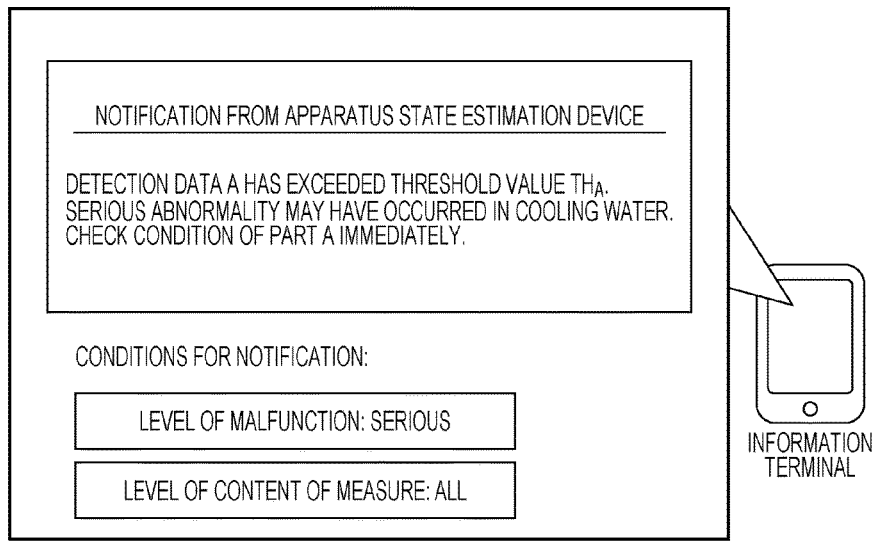
FIG. 18 illustrates a notification example of an apparatus state estimation result according to an embodiment.

The state estimating unit 126 of the apparatus state estimation device 102 may display the category 152 of the malfunction, the category 154 of the content of the measure, the level 153 of the malfunction, and the level 155 of the target content on an information terminal or the like for the maintenance service 103 on the basis of the learning result, as illustrated in FIG. 18. Thus, the user can estimate the apparatus state of the apparatus 101 with high accuracy and identify the content of an appropriate measure without carrying out a complicated operation.

Whether the display on the information terminal or the like is to be carried out or the timing of the display may be adjusted in accordance with the content of the level 153 of the malfunction and the level 155 of the target content. Thus, the display of information necessary for the user can be adjusted.

In other words, the state estimating unit 126 (data providing device) may acquire the apparatus data 111 that indicates the state of an apparatus, estimate a category of a malfunction of the apparatus or of a content of a measure by using the work record 112 of the apparatus carried out before the apparatus data 111 is acquired and the apparatus data 131, append a level that indicates that the urgency is high or a level that indicates that the urgency is low to the estimated category, and provide apparatus state estimation data that includes the estimated category and level to a display device of a user.

The state estimating unit 126 may select data to be provided to the display device in accordance with the type of the display device. For example, the state estimating unit 126 provides, to the display terminal, data of a level that indicates that the urgency is high and data of a level that indicates that the urgency is low in a case in which the display device is a stationary terminal. In other words, the state estimating unit 126 provides the data of all of the levels to the display terminal.

Thus, the user who uses the stationary terminal can grasp the entire situation regardless of the level of the urgency.

The state estimating unit 126 may provide, to the display terminal, only data of a level that indicates that the urgency is high, of data of a level that indicates that the urgency is high and data that indicates that the urgency is low, in a case in which the display device is a mobile terminal.

This can reduce the burden of the user who is outside a management center or the like. In this case, the user may check the category whose urgency is low upon arriving at the management center or the like.

Thus far, the apparatus state estimation device and the apparatus state estimation system according to the embodiments of the present disclosure have been described, but the present disclosure is not limited to these embodiments.

For example, although the learning processing and the estimation processing of the apparatus state with the use of the learning result are both carried out by the apparatus state estimation device 102 in the above description, they may be carried out by separate devices.

Although an example in which the fixed-format record and the unfixed-format record are both used as the work record has been described above, only either one of them may be used.

The present disclosure may be implemented as an apparatus state estimation method that includes a plurality of steps carried out by the apparatus state estimation device described above. For example, the apparatus state estimation method may be executed by a computer that is provided with a processing unit and a recording unit.

The processing units included in the apparatus state estimation device according to the above embodiments are implemented typically by devices or software on a server connected via a network. Here, all or part of the processing units may be implemented by an LSI, which is an integrated circuit, within the device. The processing units may each be implemented by a single chip, or part or all of the processing units may be implemented by a single chip.

Circuit integration is not limited to an LSI, and an integrated circuit may be implemented by a dedicated circuit or a general-purpose processor. A field-programmable gate array (FPGA), which can be programmed after an LSI is fabricated, or a reconfigurable processor, in which the connection or the setting of the circuit cell within an LSI can be reconfigured, may also be used.

In other words, in each of the above embodiments, each constituent element may be constituted by a dedicated hardware piece or implemented by executing a software program suitable for each constituent element. Each constituent element may be implemented as a program executing unit, such as a CPU or a processor, reads out a software program recorded on a recording medium, such as a hard disk or a semiconductor memory, and executes the software program.

The division of the functional blocks in the block diagram is an example, and a plurality of functional blocks may be implemented as a single functional block, a single functional block may be divided into a plurality of functional blocks, or part of a function may be transferred to another functional block. The function of a plurality of functional blocks having similar functions may be processed in parallel or through time sharing by a single hardware or software piece.

The order in which the plurality of steps in the above flowcharts are executed is merely an example for illustrating the present disclosure in concrete terms, and the order may differ from the above. Some of the above steps may be executed concurrently (in parallel) with another step.

The present disclosure may be implemented as an apparatus state estimation method executed by the apparatus state estimation device or the apparatus state estimation system.

Thus far, apparatus state estimation devices according to one or a plurality of aspects have been described on the basis of the embodiments, but the present disclosure is not limited to these embodiments. Unless departing from the spirit of the present disclosure, an embodiment obtained by making various modifications to the present embodiments that are conceivable by a person skilled in the art or an embodiment obtained by combining the constituent elements in different embodiments may also be included within the scope of one or a plurality of aspects.

The present disclosure can be applied to an apparatus state estimation device and an apparatus state estimation system. For example, the present disclosure can be applied to a system that manages an apparatus such as a large-sized air conditioner.

What is claimed is:

1. An apparatus state estimation method, comprising:
   acquiring, via a sensor, first apparatus data of an apparatus;
   storing, in a memory, the first apparatus data;
   storing, in the memory, a work record, the work record including a record indicating maintenance work performed on the apparatus;
   estimating, by a processor and using the work record, a category of a malfunction of the apparatus or a content of a measure performed regarding the malfunction, based upon the work record;
   learning, using the processor, a relationship between the estimated category or content and the first apparatus data;
   storing, in the memory, the learned relationship;
   estimating, using the processor, a state of the apparatus based on the learned relationship; and
   outputting, to a maintenance server, the estimated state of the apparatus,
   wherein the learning comprises determining whether the first apparatus data represents a malfunction, with respect to a value of a condition,
   further determining, after the measure is performed, whether or not the first apparatus data still represents the malfunction, with respect to the value of the condition,
   learning the relationship when the further determining indicates that the first apparatus data, after the measure is performed, does not represent the malfunction, and not learning the relationship when the further determining indicates that the first apparatus data, after the measure is performed, still represents the malfunction.

2. The apparatus state estimation method according to claim 1,
   wherein a level of the estimated category is further estimated by the using of the work record in the estimating, and
   wherein a relationship between a set of the estimated category, the estimated level, and the first apparatus data is learned in the learning.

3. The apparatus state estimation method according to claim 1,
   wherein the work record is written in free format, and
   wherein the category is estimated from the work record by using text mining in the estimating.

4. The apparatus state estimation method according to claim 1,
   wherein the first apparatus data indicates a measured value of characteristics of the apparatus or a set value of the apparatus, and
   wherein a relationship between the category and a condition that the measured value, the set value, or an index obtained through an arithmetic expression predefined from the measured value or the set value falls within a predefined range is learned in the learning.

5. The apparatus state estimation method according to claim 1,
   wherein the first apparatus data indicates a change over time of a measured value of characteristics of the apparatus or a set value of the apparatus, and
   wherein a relationship between the category and a pattern of the change over time of the measured value or the set value is learned in the learning.

6. The apparatus state estimation method according to claim 1,
   wherein the work record is written in free format, and
   wherein the estimating includes
      extracting a plurality of words from the work record,
      determining a degree of match between the plurality of words and a plurality of word lists set in advance,
      estimating a category that is associated with a word list whose degree of match is higher than a threshold value as the category of the malfunction of the apparatus or of content of a measure, and
      registering the plurality of words as a new word list when the plurality of words do not match the plurality of word lists and the degree of match is higher than the threshold value.

7. The apparatus state estimation method according to claim 1, further comprising:
   acquiring second apparatus data that indicates a state of the apparatus;
   estimating a category of a malfunction of the apparatus or a category of content of the measure, performed regarding the malfunction, based on a learning result of the learning and the second apparatus data, and
   outputting the estimated category to a display device of a user.

8. An apparatus state estimation device, comprising:
   a processor, and
   a memory including a set of executable instructions that, when executed by the processor causes the processor to perform operations including:
   storing apparatus data that indicates a state of an apparatus;

storing a work record, the work record including a record indicating maintenance work performed on the apparatus;

estimating a category of a malfunction of the apparatus or a content of a measure performed regarding the malfunction based upon the work record;

learning a relationship between the estimated category and the apparatus data;

storing, in the memory, the learned relationship;

estimating a state of the apparatus based on the learned relationship; and outputting, to a maintenance server, the estimated state of the apparatus, wherein the learning comprises determining whether the apparatus data represents a malfunction, with respect to a value of a condition, further determining, after the measure is performed, whether or not the apparatus data still represents the malfunction, with respect to the value of the condition, learning the relationship when the further determining indicates that the apparatus data, after the measure is performed, does not represent the malfunction, and not learning the relationship when the further determining indicates that the apparatus data, after the measure is performed, still represents the malfunction.

9. The apparatus state estimation device according to claim 8, wherein the work record is written in free format, and wherein the category is estimated from the work record by using text mining in the estimating.

10. The apparatus state estimation device according to claim 8, wherein the apparatus data indicates a measured value of characteristics of the apparatus or a set value of the apparatus, and wherein a relationship between the category and a condition that the measured value, the set value, or an index obtained through an arithmetic expression predefined from the measured value or the set value falls within a predefined range is learned in the learning.

11. The apparatus state estimation device according to claim 8, wherein the apparatus data indicates a change over time of a measured value of characteristics of the apparatus or a set value of the apparatus, and wherein a relationship between the category and a pattern of the change over time of the measured value or the set value is learned in the learning.

12. The apparatus state estimation device according to claim 8, wherein the work record is written in free format, and wherein the estimating includes extracting a plurality of words from the work record, determining a degree of match between the plurality of words and a plurality of word lists set in advance, estimating a category that is associated with a word list whose degree of match is higher than a threshold value as the category of the malfunction of the apparatus or of content of a measure, and registering the plurality of words as a new word list when the plurality of words do not match the plurality of word lists and the degree of match is higher than the threshold value.

13. The apparatus state estimation device according to claim 8, acquiring further apparatus data that indicates a state of the apparatus;

estimating a category of a malfunction of the apparatus or a category of content of the measure, performed regarding the malfunction, based on a learning result of the learning and the further apparatus data, and outputting the estimated category to a display device of a user.

14. A data providing device, comprising:

a processor, and a memory including a set of executable instructions that, when executed by the processor causes the processor to perform operations including:

acquiring apparatus data that indicates a state of an apparatus;

estimating a category of a malfunction of the apparatus or a content of a measure performed regarding the malfunction, based upon work record of the apparatus carried out before the apparatus data is acquired;

learning a relationship between the estimated category and the apparatus data;

storing the learned relationship;

appending a level that indicates that urgency is high or a level that indicates that the urgency is low to the estimated category; and providing, to a display device, apparatus state estimation data, based on the learned relationship, that includes the category and the level, wherein the learning comprises determining whether the apparatus data represents a malfunction, with respect to a value of a condition, further determining, after the measure is performed, whether or not the apparatus data still represents the malfunction, with respect to the value of the condition, learning the relationship when the further determining indicates that the apparatus data, after the measure is performed, does not represent the malfunction, and not learning the relationship when the further determining indicates that the apparatus data, after the measure is performed, still represents the malfunction.

15. The data providing device according to claim 14, wherein data to be provided to the display device is selected in accordance with a type of the display device.

16. The data providing device according to claim 15, wherein data of the level that indicates that the urgency is high and data of the level that indicates that the urgency is low is provided to the display device when the display device is a stationary terminal.

17. The data providing device according to claim 15, wherein, of data of the level that indicates that the urgency is high and data of the level that indicates that the urgency is low, only the data of the level that indicates that the urgency is high is provided to the display device when the display device is a mobile terminal.

18. The data providing device according to claim 14, wherein the work record is written in free format, and wherein the category is estimated from the work record by using text mining in the estimating.

19. The data providing device according to claim 14, wherein the apparatus data indicates a change over time of a measured value of characteristics of the apparatus or a set value of the apparatus, and wherein a relationship between the category and a pattern of the change over time of the measured value or the set value is learned in the learning.

20. The data providing device according to claim 14, wherein the work record is written in free format, and wherein the estimating includes extracting a plurality of words from the work record,
determining a degree of match between the plurality of words and a plurality of word lists set in advance,
estimating a category that is associated with a word list whose degree of match is higher than a threshold value as the category of the malfunction of the apparatus or of content of a measure, and
registering the plurality of words as a new word list when the plurality of words do not match the plurality of word lists and the degree of match is higher than the threshold value.

* * * * *